United States Patent Office 3,303,107
Patented Feb. 7, 1967

3,303,107
PURIFICATION OF VINYL CHLORIDE CONTAINING HCl AS AN IMPURITY BY DISTILLATION IN THE PRESENCE OF AN EPOXY COMPOUND
Frederic J. Locke, East Longmeadow, Mass., assignor to Monsanto Company, St. Louis, Mo., a corporation of Delaware
No Drawing. Filed July 18, 1963, Ser. No. 296,075
4 Claims. (Cl. 203—38)

This invention relates to the purification of vinyl chloride and, more particularly, to the removal of minor amounts of HCl therefrom.

Vinyl chloride is one of the important monomers of commerce. It is used extensively in the production of synthetic resins or plastics either as a homogeneous polymer or as a constituent of a number of polymers and/or interpolymers with other polymerizable compounds. To qualify for such use, the monomer product must have an extremely high purity. Otherwise, in the usual polymerization methods, the rate of polymerization is seriously decreased and the quality of the polymerization product may be adversely affected. Decreased polymerization rates, for example, directly affect production rates in the same order since many of the polymerization processes are batch operations where the time element is an essential factor in setting up and meeting production schedules. The presence of HCl, which is a common impurity in vinyl chloride, even in quantities as small as ten parts per million parts of vinyl chloride, is particularly undesirable because it causes development of a yellow color in the monomer which is subsequently carried over to the polymer. This impurity also gives rise to problems in the polymerization cycle because of the necessity for rigid control of pH in the polymerization reaction in order to produce polymer having the desired physical properties, particularly with regard to particle size. Thus, it is highly desirable to produce vinyl chloride substantially free of HCl, i.e., containing less than one part per million of HCl.

The usual methods of purification such as fractional distillation do not remove HCl satisfactorily and, hence, some sort of additional treatment is required to provide vinyl chloride monomer which will meet the rigid specifications with respect to this impurity. Such treatments include, for example, washing or scrubbing the vinyl chloride in the vapor phase with an aqueous caustic solution or passing the monomer in the liquid phase through a solid caustic scrubber. Adequate removal by the latter method becomes prohibitively expensive because of the size of the beds required for efficient removal or the necessity for loading such a scrubber with other reactants and/or adsorbents. Also, particles of solid caustic may become entrained with a deleterious effect on polymer properties such as electrical resistivity. The wet caustic wash is efficient but when this method is used, the vinyl chloride must be subjected to an after-treatment for drying which is both time-consuming and costly. Also, any additional steps after purification by distillation provides good chances of again contaminating the vinyl chloride.

It is an object of the present invention, therefore, to provide an improved method for obtaining vinyl chloride of extremely high purity.

It is a further object of the invention to provide a method for purification of vinyl chloride containing impurities which cannot be readily removed by distillation.

It is a specific object of the invention to provide a process for the removal of minor amounts of HCl from vinyl chloride.

These and other objects and advantages of the invention which will become apparent from the following description are attained by subjecting vinyl chloride to fractional distillation in the presence of a compound containing at least one 1,2-epoxy or oxirane group, i.e., a

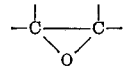

group. In the preferred embodiment of the invention, an epoxy compound of the formula

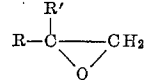

wherein R may be a hydrogen atom or an alkyl, haloalkyl, cycloalkyl, alkylene, cycloalkylene, aryl, aralkyl or alkaryl radical and R' may be hydrogen or an alkyl group or a solution of such a compound in a suitable solvent is fed to the fractionating column at a point at least several trays above the point at which the vinyl chloride is introduced. The rising vinyl chloride containing HCl is scrubbed by the epoxy compound descending the column and is withdrawn overhead substantially free of HCl. The chlorohydrin formed continues down the column together with any unreacted epoxy compound and these compounds are ejected from the system in the bottoms stream. The process is readily operated on a continuous basis and can be easily controlled to insure that only the minimum amount of epoxy compound required to maintain HCl at the desired level is added. Other points of addition of the epoxy compound are not excluded, however. For example, the epoxy compound can be added to the vinyl chloride feed stream prior to its introduction into the fractionating column, or part of the epoxy compound can be added to the vinyl chloride feed to the fractionating column and part introduced directly into the fractionating column.

The process of the invention is illustrated in the following examples which, however, are not to be construed as limiting it in any manner whatsoever.

Example 1

A stream containing approximately 98% vinyl chloride and minor amounts of chlorinated organic compounds such as chloropropylene, dichloroethylene, chlorobutadiene, dichloroethane, and trichloroethane together with butadiene and HCl was fed continuously into the lower section of a conventional fractionation column containing about 50 trays of the sieve type. The column was operated at an overhead pressure between about 120 and 130 p.s.i.a., at overhead and bottom temperatures of about 50° and 75° C., respectively, and with a reflux ratio of 1:1. Substantially pure vinyl chloride was continuously withdrawn overhead while the other components of the feed stream were continuously removed from the bottom of the column. After operation over a period of about 6.5 hours, styrene oxide was introduced continuously into the column at a point about six trays above the feed to the column for a period of about two hours at a rate of about 285 parts of styrene oxide per million parts of feed. At the end of this time, the rate of introduction of styrene oxide was reduced to about 166 parts per million parts of the vinyl chloride fed and operation under these conditions was continued for a subsequent 4 to 5 hours. Analyses of both the feed material to the column and the overhead product (OH) from the column to determine their HCl content was made periodically. Results of this operation are tabulated below and show conclusively that the presence of styrene oxide in the column substantially eliminates the HCl in the overhead vinyl chloride product.

| Elapsed Time of Operation (hr.) | Styrene Oxide Added (p.p.m.) | HCl in Feed (p.p.m.) | HCl in OH (p.p.m.) |
|---|---|---|---|
| 0 | None | 6.0 | |
| 6 | None | 327 | 3.6 |
| 6.5 | 285 | | |
| 7 | | 26 | 21 |
| 8 | | | 2.4 |
| 8.5 | 166 | | |
| 9 | | 1.4 | 1.2 |
| 10 | | | <1 |
| 11 | | 3.0 | <1 |
| 12 | | | <1 |
| 13 | | 2.3 | <1 |
| 14 | | | <1 |

*Example 2*

In another test of shorter duration, vinyl chloride containing the same chlorinated organic compounds, butadiene and HCl impurities as the feed material of Example 1 was subjected to fractional distillation in the same column and under similar conditions to those given in that example. After a period of operation with no HCl scavenger in the column, styrene oxide was added at a rate of 285 parts per million parts of the vinyl chloride fed for a period of about one hour. Analyses of both the feed and overhead streams for HCl content were made and are tabulated below. These data demonstrate the effectiveness of removal of HCl by styrene oxide during the distillation when the quantities of HCl involved are extremely small.

| Elapsed Time of Operation (min.) | Styrene Oxide Added (p.p.m.) | HCl in Feed (p.p.m.) | HCl in OH (p.p.m.) |
|---|---|---|---|
| 0 | None | 5.45 | 1.64 |
| 15 | None | | 2.21 |
| 30 | None | 6.51 | 4.24 |
| 40 | 285 | | |
| 75 | | 5.5 | 1.3 |
| 90 | | <1 | <1 |
| 105 | | 8.49 | <1 |
| 120 | | | <1 |

While the method of the invention has been illustrated with styrene oxide as the HCl scavenger, this compound is only one of many epoxy compounds which can be employed. Other suitable epoxy compounds conforming to the generic formula given above for compounds useful in practicing the invention in its preferred embodiment include, for example, ethylene oxide, propylene oxide, 1,2-epoxybutane, 1,2-epoxypentane, 1,2-epoxyhexane and the like; epichlorohydrin, epibromohydrin, epifluorohydrin, 1,2-epoxy-4-chlorobutane, 1,2-epoxy-5-bromohexane, 1,2-epoxy-3-chlorooctane and the like; 1,2-epoxy-3-butene, 1,2-epoxy-2-pentene, 1,2-epoxy-5-octene, 1,2-epoxy-3-decene and the like; 1-tolyl-1,2-epoxyethane, 1-xylyl-1,2-epoxyethane and the like; 1-benzyl-1,2-epoxyethane, 1-ethylphenyl-1,2-epoxyethane and the like; 1,1-dimethyl-1,2-epoxyethane, 1-methyl-1-phenyl-1,2-epoxyethane, and the like. Other compounds containing the epoxy group which can also be used include, for example, 1,2-epoxy cyclopentane, 1,2-epoxy cyclohexane and the like; 1,2-epoxy cyclopentene-3, 1,2-epoxy cyclohexene-3 and the like; indene epoxide, butadiene diepoxide, dicyclopentadiene diepoxide, 4-vinylcyclohexene-1 diepoxide, triphenyl ethylene epoxide, epoxidized soy bean oil and the like.

The amount of the epoxy compound to be employed will vary depending upon the HCl content of the material being purified, the desired level of removal of HCl, and the reactivity of the epoxy compound. In order to effect satisfactory removal of substantially all of the HCl present, the epoxy compound is fed to the column in which the vinyl chloride monomer contaminated with HCl is being distilled in an amount sufficient to provide a one- to 20-fold molar excess over the amount of HCl to be removed. Preferably, the mole ratio of epoxy compound to HCl is maintained from about 2:1 to about 10:1.

The epoxy compound is introduced into the distilling column per se in the liquid form or as a solution in vinyl chloride or in a solvent which has a boiling point sufficiently above that of vinyl chloride to permit easy separation therefrom by fractional distillation.

What is claimed is:

1. The process of purifying vinyl chloride containing minor amounts of HCl as an impurity which comprises distilling said vinyl chloride in the presence of an epoxy compound of the formula

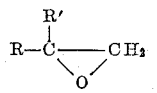

wherein R is chosen from the group consisting of the hydrogen atom and alkyl, haloalkyl, cycloalkyl, alkylene, cycloalkylene, aryl, aralkyl and alkaryl radicals and R' is chosen from the group consisting of hydrogen and the methyl radical, and recovering vinyl chloride substantially free of HCl.

2. The process of purifying vinyl chloride containing minor amounts of HCl which comprises introducing said vinyl chloride into the lower section of a fractional distillation column, introducing into the intermediate section of said distillation column an epoxy compound of the formula

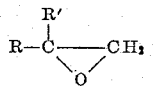

wherein R is chosen from the group consisting of the hydrogen atom and alkyl, haloalkyl, cycloalkyl, alkylene, cycloalkylene, aryl, aralkyl and alkaryl radicals and R' is chosen from the group consisting of hydrogen and the methy radical, the amount of said epoxy compound being such as to provide a mole ratio of epoxy compound to HCl within the range from about 1:1 to about 20:1, and recovering said vinyl chloride overhead by distillation from said column substantially free of HCl.

3. The process of purifying vinyl chloride containing minor amounts of HCl as an impurity which comprises introducing said vinyl chloride into the lower section of a fractional distillation column, introducing styrene oxide into the intermediate section of said distillation column, the amount of styrene oxide being such as to provide a mole ratio of styrene oxide to HCl within the range from about 1:1 to about 20:1, and recovering said vinyl chloride overhead by distillation from said column substantially free of HCl.

4. The process of claim 3 wherein the mole ratio of styrene oxide to HCl is maintained from about 2:1 to about 10:1.

References Cited by the Examiner

UNITED STATES PATENTS

| 2,371,645 | 3/1945 | Aitchison et al. | 260—652.5 |
| 2,564,194 | 8/1951 | Nie et al. | 260—652.5 |
| 2,875,586 | 3/1959 | Pohl | 260—652 |
| 2,887,516 | 5/1959 | Ferri et al. | 260—652.5 |
| 2,973,392 | 2/1961 | Graham | 260—652.5 |
| 3,043,888 | 7/1962 | Pray et al. | 260—652.5 |

NORMAN YUDKOFF, *Primary Examiner.*

WILBUR L. BASCOMB, JR., *Examiner.*